United States Patent
Drzaic et al.

(10) Patent No.: US 7,295,114 B1
(45) Date of Patent: Nov. 13, 2007

(54) LOCATION MANAGEMENT FOR RADIO FREQUENCY IDENTIFICATION READERS

(75) Inventors: Paul Stephen Drzaic, Morgan Hill, CA (US); Arno Allan Penzias, San Francisco, CA (US)

(73) Assignee: Alien Technology Corporation, Morgan Hill, CA (US)

( * ) Notice: Subject to any disclaimer, the term of this patent is extended or adjusted under 35 U.S.C. 154(b) by 150 days.

(21) Appl. No.: 11/040,551

(22) Filed: Jan. 21, 2005

(51) Int. Cl.
  *G08B 13/14* (2006.01)
(52) U.S. Cl. .............. 340/572.1; 235/385; 340/825.49
(58) Field of Classification Search .............. 340/572.1
  See application file for complete search history.

(56) References Cited

U.S. PATENT DOCUMENTS

| | | | |
|---|---|---|---|
| 6,380,894 B1* | 4/2002 | Boyd et al. ............... | 342/450 |
| 6,696,954 B2* | 2/2004 | Chung ..................... | 340/572.7 |
| 6,705,522 B2* | 3/2004 | Gershman et al. ........ | 235/385 |
| 6,975,229 B2 | 12/2005 | Carrender | |
| 7,038,573 B2* | 5/2006 | Bann ........................ | 340/10.1 |
| 7,049,942 B2* | 5/2006 | Gallovich ................ | 340/426.1 |
| 7,082,344 B2* | 7/2006 | Ghaffari ................... | 235/385 |
| 7,167,095 B2 | 1/2007 | Carrender | |
| 2005/0054350 A1* | 3/2005 | Zegelin .................... | 455/456.1 |
| 2005/0104790 A1* | 5/2005 | Duron ....................... | 340/572.7 |
| 2005/0146464 A1* | 7/2005 | Zegelin et al. ............ | 342/453 |
| 2005/0246094 A1* | 11/2005 | Moscatiello ............ | 340/825.49 |
| 2005/0253722 A1* | 11/2005 | Droms et al. ............ | 340/572.1 |
| 2006/0022038 A1* | 2/2006 | Hewlin et al. ............ | 235/385 |
| 2006/0027658 A1* | 2/2006 | Genc et al. ............... | 235/454 |
| 2006/0071790 A1* | 4/2006 | Duron et al. ............. | 340/572.1 |
| 2006/0170565 A1* | 8/2006 | Husak et al. ............. | 340/572.1 |

OTHER PUBLICATIONS

Kulyukin, Vladimir, et al., "RFID In Robot-Assisted Indoor Navigation for the Visually Impaired," Proceedings of the 2004 IEEE/RSJ International Conference on Intelligent Robots and Systems (IROS 2004), Sendai, Japan, 2004, 6 pages.

Kantor, George, et al., "Preliminary Results in Range-Only Localization and Mapping," Proceedings of the IEEE Conference on Robotics and Automation (ICRA 2002), May 2002, 6 pages.

Betancourt, Ivette, et al., "Wireless Navigation Using RFID Network," San Jose State University Department of Electrical Engineering, EE198B—Senior Project, http://www.engr.sjsu.edu/rkwok/projects/robot_Bshort.PDF, Dec. 19, 2003, 31 pages.

* cited by examiner

*Primary Examiner*—Benjamin C. Lee
*Assistant Examiner*—Eric M. Blount
(74) *Attorney, Agent, or Firm*—Blakely, Sokoloff, Taylor & Zafman LLP

(57) ABSTRACT

A Radio Frequency Identification (RFID) system for managing and identifying locations for an RFID reader is disclosed. An expected location of a fixed radio frequency identification (RFID) reader is determined. A first signal is transmitted from the reader to a first RFID tag to determine whether the reader is at the expected location. The first tag is a fiducial RFID tag fixed at a first location. In one aspect, the reader receives a first response to the first signal from the first tag. The first response identifies the first location of the first tag. The first location is compared to the expected location. If the first location and the expected location are different, an alarm is triggered.

11 Claims, 11 Drawing Sheets

Fiducial Set Data Record $$\{A\} \times \{B\} = \{C\}$$

Table C $$\{C\} = \begin{Bmatrix} 0 & 0 & 0 \\ 1 & 0 & 0 \\ 2 & 0 & 0 \\ 3 & 1 & 0 \\ 4 & 2 & 0 \\ 5 & 3 & 1 \\ 5 & 4 & 2 \\ 4 & 5 & 3 \\ 3 & 5 & 4 \\ 2 & 4 & 5 \\ 1 & 3 & 5 \\ 0 & 2 & 4 \\ 0 & 1 & 3 \\ 0 & 0 & 2 \\ 0 & 0 & 1 \end{Bmatrix}$$

FIG. 2B

| FIDUCIAL TAGS: | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| READING A | | | 1 | 1 | | | | | 1 | 1 | | | 1 | 1 | | | | 1 | | |
| READING B | 1 | | | 1 | | 1 | | | 1 | 1 | | 1 | | | 1 | | 1 | | | |
| READING C | | | | 1 | 1 | 1 | | | 1 | | 1 | 1 | | | | | | 1 | | 1 |
| TOTAL: | 1 | 0 | 1 | 3 | 1 | 2 | 0 | 0 | 3 | 2 | 1 | 2 | 1 | 1 | 1 | 0 | 1 | 2 | 0 | 1 |

FIG. 2D

LOCATION MANAGEMENT FOR RADIO FREQUENCY IDENTIFICATION READERS

TECHNICAL FIELD

This disclosure relates generally to Radio Frequency Identification (RFID) systems, and in particular but not exclusively, relates to location management for RFID readers.

BACKGROUND INFORMATION

Goods and other items may be tracked and identified using a radio frequency identification (RFID) system. The RFID system includes an RFID tag, which is typically placed on the item to be tracked. The RFID tag is a small transponder that can be read by an RFID reader (also referred to as an RFID interrogator). The reader includes a transceiver and an antenna. The antenna emits electromagnetic (EM) waves generated by the transceiver, which, when received by the tag, activate the tag. Once the tag has been activated, the tag communicates using radio waves back to the reader, thereby identifying the item to which the tag is attached or is otherwise associated with. In one form of RFID, the tag modifies and reflects the waves emitted by the reader, using the modified and reflected waves to communicate with the reader. In another form of RFID the tag emits a radio signal which is detected by the reader.

The reader may be a fixed or mobile device that transmits a radio signal which may be intercepted by the tag. When the tag encounters the radio waves, the tag detects the signal and is activated. Data encoded in the tag can then be transmitted to the reader for further processing. This system allows for quick and easy identification for a large number of items by simply passing them through the scope of a reader. This system will also identify items on which a tag is not exposed, such as items in which the tag is located internally. Further, the reader can read multiple tags very quickly, such as items passing by the reader while the items are on a conveyer belt.

There are three basic types of RFID tags. A beam-powered tag is a passive device which receives energy required for operation from the radio waves generated by the reader. The beam powered tag rectifies an EM field and creates a change in reflectivity of the field which is reflected to and read by the reader. A battery-powered semi-passive tag also receives and reflects EM waves from the reader, however the battery powered tag includes a battery to power the tag independent of receiving power from the reader. An active tag actively transmits EM waves which are then received by the reader.

Applications of RFID systems typically involve a reader identifying a tagged object. In many cases, the value of this information is that it provides a reference that the tagged item was at a particular location, at a particular time. To identify the location of the tagged item, it is assumed that the location of the reader is known. If the reader location is uncertain, some applications of RFID can be compromised. For example, anti-theft or inventory control applications of RFID assume that a reader is near a particular door or path, or at a specific location. In such an application, if the reader is unexpectedly moved, or if the reader malfunctions, there may be adverse results. For example, the reader owner may falsely assume that a particular doorway is being covered by the reader, or the reader may report an incorrect location for an object. In another situation, the reader may become shielded or damaged in some way, so that the coverage area of the reader becomes greatly diminished without notification to the network, and all or some tags pass by the reader without being detected, either intermittently or for an extended period of time.

SUMMARY OF THE DESCRIPTION

The present invention relates to a Radio Frequency Identification (RFID) system for managing and identifying locations for an RFID reader. Fixed RFID tags, referred to as fiducial tags, may be used to identify a current location of an RFID reader. The fiducial tags may be embedded in structural elements of a building, such as in a doorway where inventory is tracked as it leaves or enters the building. In one exemplary aspect, an RFID reader placed in proximity to the doorway reads RFID tags placed on tracked items passing through the doorway. To ensure a reader owner/administrator that the reader is indeed covering the intended doorway, the reader reads one or more fiducial tags positioned at the doorway. The response from the fiducial tag includes information which may be decoded into a specific location associated with the fiducial tag. Since the fiducial tags are substantially immobile and represent a fixed location, if a reader reads a fiducial tag associated with the reader's intended location, the reader's location is verified, thereby assuring a reader owner that the reader is covering its intended area, among other benefits.

In one aspect, where the reader is assigned to a specific expected location, upon reading a fiducial tag, the reader may compare the fiducial tag location with the reader's expected location. If the locations are not the same, or the fiducial tag location is not within a range of permissible expected locations for the reader, an alarm may be triggered. Similarly, the alarm may be triggered if the reader is unable to read any known fiducial tag. In one aspect, if the fiducial tag can only be read in an intermittent fashion, this information can be used to trigger an alert or alarm.

In another aspect, a mobile RFID reader may read a fiducial tag to affect the function of the reader. For example, upon reading a specific fiducial tag, the reader may associate subsequently scanned tagged inventory items with the fiducial tag location. In one aspect, upon reading a specific fiducial tag, the reader may alter its mode of operation, or its status (e.g. on/off). In one aspect, the reader may adjust its effective range by controlling some aspect of its ability to read tags (such as output power). In this way, the reader at full power could be used to find a fiducial tag at some large distance, and then the power of the reader is subsequently reduced. This will enable the reader to successively move closer and closer to a fiducial tag by narrowing the area covered by the reader.

In another aspect, combinations of fiducial tags and item tags can be used to provide a convenient means of mapping the location of mobile tagged items, or assisting in the location of these items through association with one or more fiducial tags.

In another aspect, an RFID reader may be configured to interact with a human user, a machine, or an animal as a result of associating the reader with a particular location tag.

In another aspect, sensor data input to the reader in conjunction with location tags can be used to develop a map of the sensor input over the locations identified by the reader and fiducial tags.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2B illustrates an embodiment of a weighting table based on RFID reading data.

FIG. 2D is a table illustrating an embodiment of the association of fiducial and item level RFID tags.

DETAILED DESCRIPTION

Embodiments of a system and method for radio frequency identification (RFID) location management are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

RFID systems can be active (transmitting) or passive (operating through a backscatter mechanism). Passive (backscatter) systems can be battery assisted (e.g. to increase range) or operate without a battery (e.g. for low cost and independence of any battery life). This last category of RFID systems are often called "beam-powered" tags. Embodiments of the present system should be particularly useful for beam-powered tags, as these can provide a permanent marker for a location. Nevertheless, battery-powered backscatter tags and transmitting tags may be used in embodiments of the present invention if increased range is desired. It will be recognized that an RFID reader can also be configured to act as an RFID tag, serving both functions.

Figure 1:
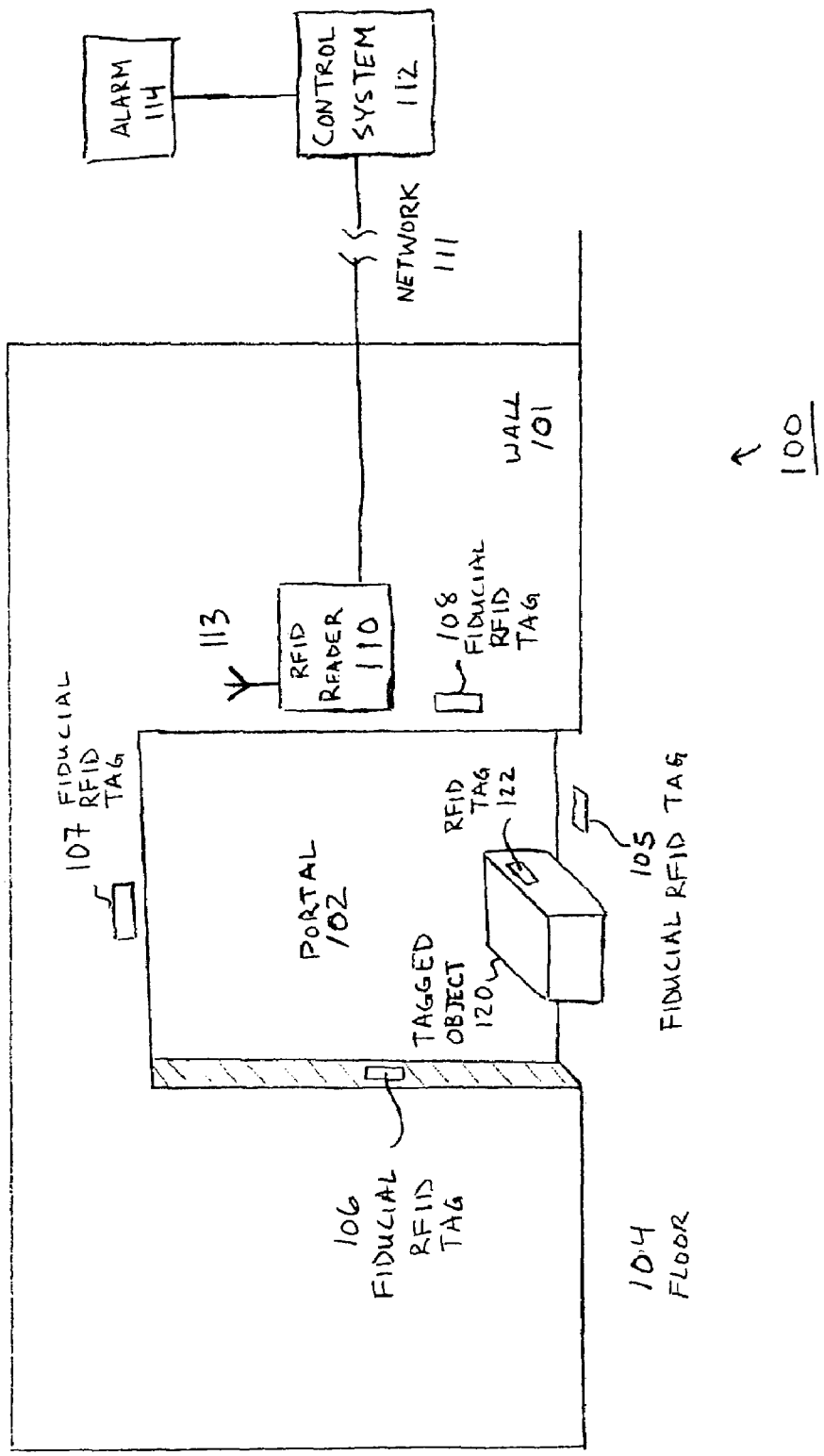
FIG. 1 illustrates an embodiment of a Radio Frequency Identification (RFID) system with fiducial RFID tags.

FIG. 1 illustrates a system level overview of an embodiment of the invention. According to an embodiment of the invention, fixed Radio Frequency Identification (RFID) tags, referred to as fiducial tags, may be used to identify a current location of an RFID reader. By verifying the location of a reader, a reader owner may be assured the reader is covering its intended area, among other benefits. In one embodiment, system 100 includes RFID tags 105, 106, 107, 108 fixed proximate to a portal 102. In one embodiment, a portal 102 is a point at which objects 120 tagged with conventional RFID tags 122 (item tags) are tracked as they arrive or leave a location, such as an entry or exit for inventory or other items tracked by an RFID tag 122. For example, in one embodiment, a portal 102 may include a door, entryway, hall, gate, dock, cash register or point of sale, warehouse shelf, etc. Examples of RFID tagged objects include items such as goods, inventory, merchandise, pallets, animals, people, hazardous materials, as well as any other items that may be tracked with RFID tags.

By fixed RFID tags, it is meant that the fiducial RFID tags are associated with a specific location or context. In one embodiment, a fiducial tag is substantially immobile and stationary at a specific location, in contrast to a conventional RFID tag that is typically attached to moveable objects or items, such as inventory (i.e. an item tag). For example, the fiducial tags may be embedded, affixed, attached, or otherwise coupled to a fixed location, such as in or on a wall, or any other fixed object that is associated with a particular location (e.g. a doorway). Such fixed tags may be referred to as fiducial tags or fiducials, since in one embodiment, the fixed tags are permanently affixed to and associated with specific known locations or contexts, and thus can be trusted to confirm a reader's proximity to the location associated with the tags. Thus, the tags may serve as positional fiducials or landmarks. In another embodiment, fiducial tags are attached to moveable objects, such as for example vehicles or containers used to transport goods. For example, in one embodiment, a fiducial tag is fixed to a vehicle used to ship goods, such that a reader may identify itself as being proximate to the specific vehicle. In another embodiment, a fiducial tag is attached to a seasonal or promotional display within a store. In one embodiment, upon reading a fiducial tag, information is immediately provided to the reader about its location; it is not necessary to deduce the reader's location based on any particular order at which the fiducial tags are accessed.

In one embodiment, the tags 105-108 may be secured to, embedded in, or otherwise coupled to various structural elements of a building or other environment. For example, in one embodiment, tag 106 is built into the frame or side of doorway 102. In another embodiment, a tag 105 is fixed to a floor tile or under the floor 104. In one embodiment, tags 107 and 108 are fixed on a wall 101 around a portal 102. In yet another embodiment, fiducial tags may be placed at varying heights, not only to potentially increase their readability, but also to designate various locations having different elevations. Thus, at a single two dimensional location, there may be a plurality of fiducial tags at varying heights. This may be useful in warehouses that have several levels of storage on a single floor. In one embodiment, a unique code is programmed into the fiducial tags 105-108 that associates each tag with the particular location at which it is fixed. Since RFID systems do not require line of sight operation, the fiducial tag can be embedded in an object, or placed behind an object. Thus, in one embodiment, the presence of a fiducial tag may be hidden or concealed. For example, the fiducial tag may be attached to a structural member, such as a wall, in a manner that makes it inconspicuous. This may minimize tampering with the fiducial tag, since it's presence would not visually apparent to a passerby. An RFID reader 110 positioned proximate to the portal 102 periodically or non-periodically scans the tags 105-108. By scanning the tags, it is meant that the RFID reader transmits as signal to elicit a response from tags within range. FIG. 1 illustrates RFID reader 110 positioned on wall 101 near portal 102. In one embodiment, reader 110 is intended to be stationary or fixed at specific location. The reader 110 functions to, among other things, read or scan tagged items passing through the portal. For example, tagged items may be scanned by the reader 110 when a forklift passes a pallet of tagged items through portal 102.

It will be appreciated that in one embodiment, the main components of RFID reader 110 may be distant from portal 102, yet the reader 110 may still effectively cover a portal 102 through an attached antenna 113 which is proximate to portal 102. When the reader 110 successfully reads the tags 105-108, the reader 110 can be associated with a particular location, e.g. portal 102. If the reader 110 malfunctions, is moved away from or out of range of portal 102, or is blocked, the reader 110 will no longer be able to read the fiducial tags 105-108 for that location, or the reader 110 may read a different fiducial tag associated with a different location. This lack of response, or changed response, can be used to alert a control system 112 that the reader 110 may not be in its original or expected location, allowing the reader owner or administrator to respond appropriately. Control system 112 may be a server computer on network 111 that receives the information from tags scanned by reader 110. Control system 112 may also transmit control and other information to reader 110, such as programming the reader 110 with its expected location.

In another embodiment, the lack of the reader's 110 ability to read a fiducial tag could trigger an indication (e.g. notification, alert, alarm) that a reader 110 has malfunctioned, that the reader 110 is being shielded from scanning its expected area, or even that a tag has malfunctioned or been removed. The reader 110 may be coupled to a control system 112 through a network 111. In one embodiment, the reader 110 may be coupled to the network 111 wirelessly, or via a wired connection.

In one embodiment, intermittent detection of a fiducial tag causes an alert or alarm to be triggered. By intermittent detection, it is meant that a reader's ability to detect a particular fiducial tag is not continuous, i.e. the detection of the fiducial tag by the reader comes and goes at intervals. For example, in a situation where a stationary reader 110 is able to read a fiducial tag, the tag may become unreadable for a period of time, after which it becomes readable again by the reader 110. This intermittent detection of the fiducial tag may be indicative of several situations which may require notification or alert, such as potential tampering with either the fiducial tag or the reader, a malfunction in the fiducial tag or the reader, etc. Furthermore, the intermittent detection may be caused by a periodic interference with the reader's ability to read to the fiducial tag, such as objects causing the reader's antenna to be shielded, or opaque objects passing between the reader and the fiducial tag. Alerts or other notifications triggered by this intermittent reading of a fiducial tag may be useful to identify potential problems with a particular deployment of an RFID system.

In one embodiment, an alarm 114 is coupled to the reader 110, so that if the reader 110 can no longer read a fiducial tag associated with the reader's 110 expected location, alarm 114 can be triggered. Alarm 114 may be an audible, visual, electronic or other type of notification to indicate that the reader may not be in its expected location. In one embodiment, the alarm is integrated with the reader. In another embodiment, the alarm 114 is coupled to the reader through a network 111. In an inventory control situation, this alarm 114 could alert the system administrator/owner that the reader 110 was no longer functioning or located within the area expected. In one embodiment, a reader's expected area is an area to which a reader is assigned to scan tags in, such as for example, a particular doorway or point-of-sale (POS).

The embodiment of system 100 illustrated in FIG. 1 includes several fiducial tags to mark portal 102. Using more than one fiducial tag to mark a particular area provides redundancy, among other benefits. Thus, if noise, moving objects, or other factors interfere with one fiducial tag being read, the presence of other fiducial tags can provide assurance that the reader 110 has not been moved and is functioning properly. It will be appreciated, however, that in other embodiments, more or less fiducial tags may be used to mark a portal. For example, in one embodiment, a single fiducial tag may be employed to mark a particular location or portal. In one embodiment, multiple fiducial tags are used to mark a particular location to provide a range over which a reader may operate, yet still be within its expected location. It will further be appreciated that for clarity, various embodiments of the invention are described herein with respect to reading a single fiducial tag, but that embodiments involving multiple tags are also contemplated for use with other embodiments.

In one embodiment, multiple fiducial tags are placed at a portal to provide additional information about the operation and efficacy of a reader. For example, a portal may have several fiducial tags associated with it. In one embodiment, as illustrated in FIG. 1, a reader 110 (or its antenna 113) is positioned on one side of a portal 102. The proper operation of reader 110 may be verified by the reader's ability to read a fiducial tag 108, located on the same side of the portal 102 as the reader 110. When portal 102 is unimpeded, reader 110 may also read at least one fiducial tag 106. If a radio-opaque object (i.e., an object through which the passage of radio waves is impeded) passes through the portal between reader 110 and fiducial tag 106, or if a source of radio frequency noise becomes active or moves close to the reader, then the reader may not be able to read fiducial tag 106. Thus, when reading the contents of a palette of tagged items passing through the portal, the reader's ability to read fiducial tag 106 (or other fiducial tags across the portal from the reader) indicates to the system that the reader's signal has penetrated through the palette. Furthermore, in one embodiment, multiple unique fiducial tags may be located on the far side of the portal (i.e. the side on which fiducial tag 106 is located), such as number of fiducial tags spaced about six inches from the floor 104 to the top of the portal. By unique fiducial tags, it is meant that each of the tags may be associated with the specific portal, but that each tag represents a different absolute location with respect to the portal. For example, fiducial tag 106 may generally be associated with portal 102, while specifically representing the far side of portal 102, five feet above the floor. In such an embodiment, the reader's inability to read some of the tags may be used to identify the height or dimensions of the opaque object passing through the portal. For example, if a palette was pulled through the portal on a metal dolly of a known height, the system could infer whether or not a blockage of the reader's signal was due to material on the palette.

In another embodiment, multiple fiducial tags placed in varying orientations may be used to mark a single location. For example, two fiducial tags may be oriented at a ninety degree angle from each other to receive reader signals at varied polarizations. This may increase the likelihood that a reader will receive a response from a fiducial even if the reader's antenna is moved unexpectedly. In an exemplary embodiment, where two tags at a location are oriented at a ninety degree angle from each other, a reader may determine the orientation or polarization of its antenna, depending on which of the fiducial tags is read. For example, if a reader reads only a first fiducial tag, this may indicate a specific polarization of the antenna. This may be useful, since the polarization of the reader's antenna may affect subsequent scanning of tagged items, depending on the orientation of the tags on the items. Alternatively, the spatial gain or orientation of the reader may be adjusted to provide additional refinement in reading the tag.

In one embodiment, a fiducial tag may have a limited range, or alternatively, a fiducial tag's range may intentionally be degraded, to localize performance of a reader's antenna; i.e. the fiducial tag is only likely to be read if the reader's antenna is within a very limited, specific position and orientation. For example, if the reader's antenna is shielded, bumped or angled out of position, it may assume an orientation that will result in an inability to read the degraded fiducial tag, thereby triggering an alarm or other notification.

In yet another embodiment, a reader may be required to read a plurality of tags to verify its proper location and function. For example, where a reader is positioned in approximately the center of a portal, it may be required to read two fiducial tags, each at opposite ends of the portal and each just within range of the reader, to ensure the reader's coverage of the entire portal. Thus, if the reader can read both fiducial tags at opposite ends of the portal, the reader's position is localized between the two fiducial tags. Similarly, in another embodiment, multiple fiducial tags may be positioned to localize a reader's location. For example, a mapping function may be used to localize the reader based on which fiducial tags it is able to read. In another embodiment, upon reading a fiducial tag, a reader may lower its scanning range over successive reads to determine an estimated range from the reader to a tag.

In one embodiment, a reader's power level or range may be determined based on the fiducial tags it is able to read. In an exemplary embodiment, a series of five tags may be spaced at intervals from a fixed reader. If the reader can read the four closest of the five tags, this may indicate acceptable operation of the reader. However, if the reader can only read the two closest of the five tags, this may indicate abnormal function of the reader, and an alarm may be triggered.

Additionally, in one embodiment, the number of tags read could be made a function of reader power, so that the reader could query different areas by controlling its output power. For example, in one embodiment, the reader may adjust its effective range by controlling some aspect of its ability to read tags (such as output power). In this way, the reader at full power could be used to find a fiducial tag at some large distance, and then the power of the reader is subsequently reduced. This will enable a mobile reader, for example, to successively move closer to a particular fiducial tag by narrowing the area covered by the reader.

In one embodiment, anti-spoofing or authentication measures may be incorporated into the reader, the fiducial tag, or both, to prevent a reader from reading a false or counterfeit fiducial tag (e.g. a tag falsely indicating a location other than where it actually is). For example, without adequate security measures, a thief could move a reader from its expected location, and by providing a false fiducial tag within range of the moved reader, could potentially mimic an authentic fiducial tag, resulting in a reader falsely indicating coverage of a specific location. In one embodiment, this problem may be avoided by including security measures to verify the authenticity of a fiducial tag, such as cryptographic keys for encoding the fiducial tag's response. Such authentication measures may be implemented through software or hardware components. In one embodiment, security measures can be implemented within the fiducial tag to guard against accidental or malicious reprogramming of the tag. As an additional security measure, a trusted source could securely reprogram the fiducial tag from time to time to prevent eavesdroppers from identifying the permanent ID of a fiducial tag. In another embodiment, the fiducial tag can be programmed only to respond to readers that provide the proper authentication, such as a security code, to the reader.

Figure 2:
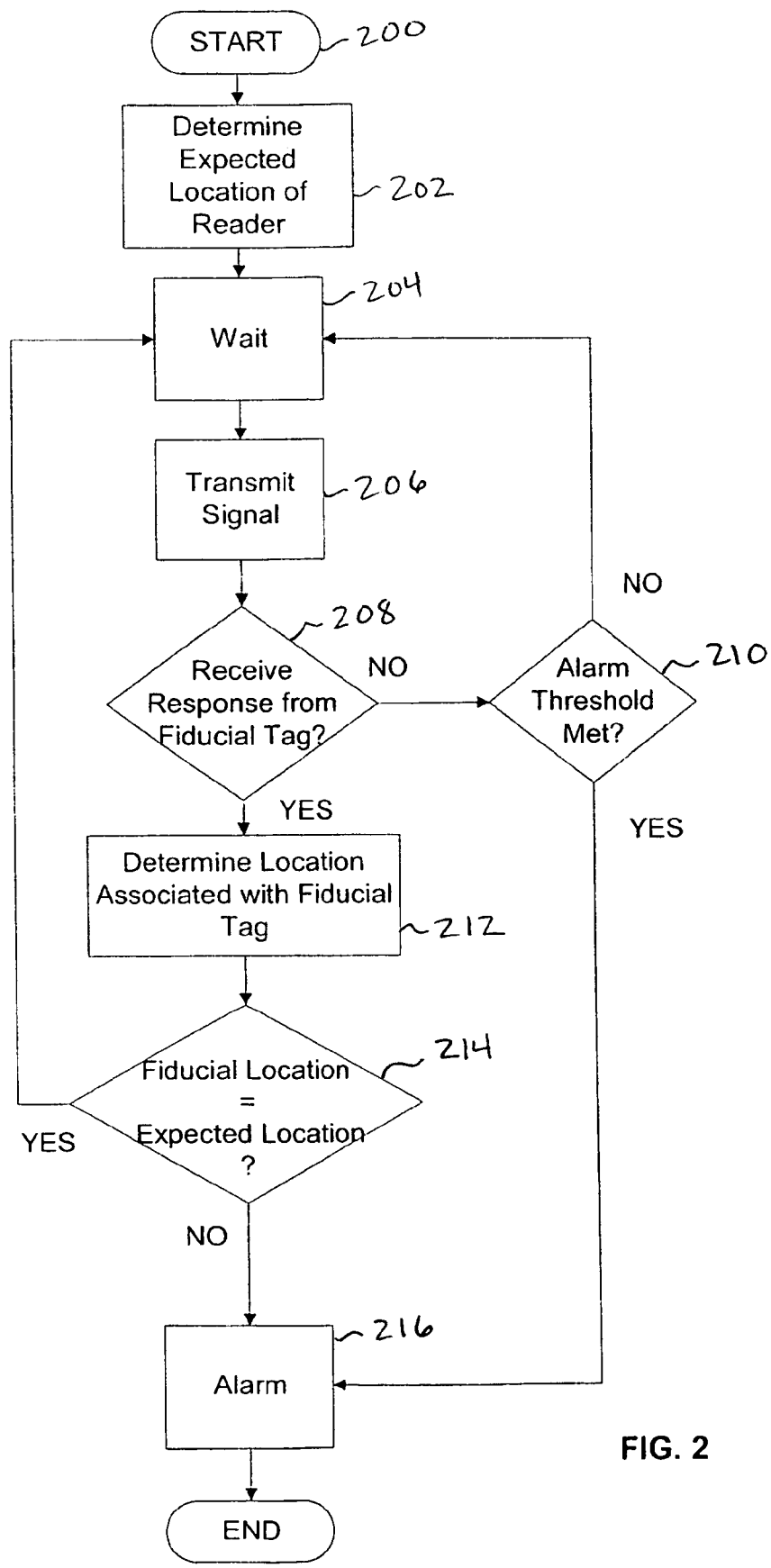
FIG. 2 illustrates an embodiment of an RFID reader location method.

FIG. 2 illustrates an embodiment of an RFID reader location method 200. In one embodiment, the method 200 is performed at least in part by a reader, such as reader 110 of FIG. 1. In another embodiment, the method 200 is performed at least in part on a control system coupled to the reader through a network. At block 202, the method 200 determines an expected location of the RFID reader. The expected location of the reader is a location at which the reader is designated to operate. For example, an expected location for a reader may be a particular dock door or hallway; i.e. the reader is used to track tagged items at the expected location. In another embodiment, the expected location may not necessarily be a physical location, but rather a proximity to a specific fiducial tag. For example, a reader's expected location may be one in which it is able to read a fiducial RFID tag having a specific identification number. This may be exemplified by a situation where a reader is used to scan inventory on a truck or other mobile vehicle; the truck may have a fiducial RFID tag associated with it, such that a reader may identify its location as being proximate to the truck, not necessarily a specific geographic location.

The expected location may be provided to the reader in multiple ways. In one embodiment, the expected location is transmitted to the reader through a network coupled to the reader. In another embodiment, the expected location is provided to the reader by reading a fiducial tag within range of the reader, and assigning the fiducial's location as the reader's expected location. In yet another embodiment, the expected location can be input by a user through various input devices, such as a keypad, tablet, voice, or other such input means. Additionally, the expected reader location may be stored either locally at the reader, or may be stored on a control system connected to the reader through a network.

At block 204, the method 200 waits a predetermined amount of time before transmitting a signal from the reader at block 206 to scan for fiducial tags. The signal transmitted is to elicit a response from RFID tags within range of the reader, such as fiducial RFID tags as well as RFID tags attached to tracked items. For example, in one embodiment, the reader may be programmed to transmit a signal to check for fiducial tags within range once every second. It will be appreciated that other time intervals may be used, depending on the desired application.

At block 208, the method determines whether a response has been received from a fiducial tag. If a response is not received from a fiducial tag at block 208, the method 200 determines whether an alarm threshold has been met at block 210. The alarm threshold is a limit that specifies the number of failed attempts to locate a fiducial tag before an alarm or other action is triggered. The threshold is useful since if a fiducial tag is only temporarily blocked from a reader's scope, an alarm response is not unnecessarily triggered. Examples of situations that may prevent a reader from reading a fiducial tag that is within range of the reader may include RF interference, the tag is currently being read by another reader, and frequency hopping of the reader, among others. In one embodiment, an alarm response may be deferred until a fiducial has repeatedly failed to respond over a sustained period of time. It will be appreciated that the threshold may be adjusted depending on the particular application. Alternatively, in one embodiment, the threshold may be eliminated altogether, to provide immediate notification that a reader cannot read a fiducial tag.

Thus if the alarm threshold has not been met at block 210, the method 200 again waits at block 204 for the next fiducial scanning event. If the alarm threshold has been met at block 210, an alarm is triggered at block 216. In one embodiment, the alarm is a notification that the reader has not received a response from a fiducial tag. The alarm may be an audible, visual, electronic or other type of alarm, which functions to notify the reader owner/administrator that there may potentially be something abnormal with either the reader, e.g. it has been moved, it is malfunctioning. Alternatively, the alarm may comprise a mechanical event, such as lowering a gate, locking a door, disabling a piece of machinery, or other actions that may be used as a security function. Alternatively, the alarm may comprise activating a "challenge and response" action, in which a user is provided a means of deactivating the alarm, or triggering a desired response, upon providing the appropriate input to the system.

Returning to block 208, if a response is received from a fiducial tag, the method 200 determines the location associated with the fiducial tag at block 212. In one embodiment, a response received from a fiducial tag consists of a unique identification number. The ID number may be decoded to identify a location associated with the responding fiducial tag. The location information associated with the fiducial tag may be generalized, such as "Loading Dock," "Cash Register," "Truck," "Table", "Sofa", "Television", or it may be more specific, such as latitude and longitude coordinates, altitude, or elevation (e.g. distance from the floor). For example, the location may represent a location or area in a store or warehouse, for example a particular aisle, section, cross aisle, department, or shelf. The location associated with the fiducial tag may refer to a moveable platform, such as for example the inside of a truck or trailer.

In one embodiment, the decoding process may be performed either locally at the reader, or remote from the reader by a networked control system. In another embodiment, the response from the fiducial tag itself directly identifies the fiducial tag's associated location. For example, in one embodiment, the fiducial tag response is in the form of latitude and longitude coordinates. In yet another embodiment, the fiducial tag response may include altitude or elevation information. This may be useful, for example, in a warehouse with shelves of various heights, to localize a fiducial tag to a shelf at a specific height.

At block 214, the method 200 compares the location associated with the fiducial tag with the expected location of the reader. If the fiducial location and the expected location are the same, the method 200 returns to wait block 204, to wait for the next fiducial scanning event. In one embodiment, the method 200 does not require that the fiducial tag location and the expected location are necessarily the same. Rather, in one embodiment, there may be a range of permissible expected locations for the reader. For example, in an embodiment where a mobile reader is used, the reader's expected location may encompass a range of locations, and not only a single fixed location. As such, the reader may be within its expected location as long as it can read one of a plurality of fiducial tags. If the method 200 determines at block 214 that the fiducial location and the expected location are not the same (or alternatively, that the fiducial location is not within a range of expected or permissible locations), an alarm is triggered at block 216.

In one embodiment, the method 200 serves to verify or prove a reader's location with certainty. This may provide a reader owner with assurance that once a reader is deployed at a particular location, it is effectively covering its intended area. Thus, if the reader were to be unexpectedly moved out of its intended area of coverage, it would not be able to read a fiducial tag coinciding with the reader's expected location, and the network would be notified with an alarm.

In one embodiment, various fiducial tags may be used to localize, estimate or identify a mobile reader's location, in addition to the location of tagged items located proximate to the fiducial tags, by interpolating a probable position based on the reader's ability to read specific tags at varying locations. In an exemplary one-dimensional embodiment, consider one hundred fixed fiducial tags, F0 through F99, positioned linearly and sequentially at equally spaced intervals (e.g. one meter) along an aisle of a warehouse. The fiducial tags are placed at known locations, and a mobile RFID reader moves down the aisle from F0 towards F99, periodically reading tags within its range, the reader having a read range between one and ten meters. Further, an item is tagged with an RFID tag (tag X) is located on a shelf between fiducial tags F22 and F23.

In one embodiment, a system stores a running list of item tags and fiducial tags the reader is able to simultaneously read as it moves down the aisle. For example, as the mobile RFID reader moves down the aisle from F0 towards F99, the first time it is able to read tag X, the reader is also able to simultaneously read fiducial tags F13-F22; thus the list will include fiducial tags F13-F22 and tag X. As the reader continues down the aisle towards F99, the reader will continue to read F23 until the reader no longer is able to read tag X. From this information, the system may employ an algorithm to associate the item to which tag X is attached with two fiducial tags (and thus localize its position as being between them), the first being the fiducial tag most recently added to the list when tag X was first read by the reader (i.e. F22), and the second being the fiducial tag most recently dropped from the list when the reader is no longer able to read tag X (i.e. F23). Thus, the system may conclude that the package with tag X is likely located between fiducial tags F22 and F23.

Figure 2A:
FIG. 2A illustrates an embodiment of tables based on RFID reading data.

In another embodiment, the system may use a mathematical algorithm to determine the most probable location for an item. In one exemplary embodiment, consider a set of fiducial tags that are read over a period of time by a mobile RFID reader. Each time the mobile reader takes a reading, it notes the time of the reading, which fiducial tags that were read, and which item tags were also read at that time. These data are then used to fill matrices or data tables {A} and {B}, embodiments of which are illustrated in FIG. 2A. Tables {A} and {B} may be stored within memory of the reader, or remotely, such as at a network server. In table {A} (matrix {A}), the columns represent the time of the reading, while the rows represent a particular fiducial tag.

In table {A}, the first column represents the reading at a particular time. For each row in that column, a "1" is entered if the fiducial tag is read, and a "0" is entered if the fiducial tag is not read. For example, in the first column, fiducial tags 1, 2, 3, 4, and 5 are read, and are marked as "1". Other fiducial tags are not read, and so are labeled as "0".

At the same time, a table {B} (matrix {B}) is generated for each respective reading time, corresponding to whether an item tag is observed or not. For this example, assume that there are three item tags "A", "B", and "C", each corresponding to a column of table "B". The rows in each column correspond to a particular time of reading. If the item is read at that time, then a "1" is entered; if an item is not read at that time, a "0" is entered. The number of columns in table "A" corresponds to the number of rows in table "B".

In one embodiment, an algorithm operating on the data stored in tables {A} and {B} can be used to determine the most likely location for a tagged object. For example, simple matrix multiplication is used to generate a table {C} (matrix {C}), an embodiment of which is illustrated in FIG. 2B, that provides the weighting function of an item at each location. In one embodiment, table {C} is derived using the equation {A}×{B}={C}, where {C} is the product of {A} and {B}.

The values within Table {C} can be interpreted to mean that item tags A, B, and C, each represented by a column of data, are near, respectively, the fiducial markers associated with the rows with the highest score (in this case, the score is "5"). Thus, item tag A is near fiducial tags #6 and #7 ($6^{th}$ and $7^{th}$ rows), item tag B is near fiducial tags #8 #9, and item tag C is near fiducial tags #10 and #11 ($10^{th}$ and $11^{th}$ rows). This technique may be particularly beneficial in situations where large numbers of fiducial tags, item tags, and time stamps are used, as the matrix mathematics remains computationally simple to perform.

It should be recognized that in other embodiments, other types of algorithms may be used, particularly in conjunction with matrix mathematics. For example, in one embodiment, a weighting function may be added to particular time stamps or fiducial tags, to provide more weight to those tags in the computation. Various types of algorithms (linear and non-linear) may be used which allow for a machine to provide an estimation as to the location of a tagged item based on the available data.

Figure 2C:
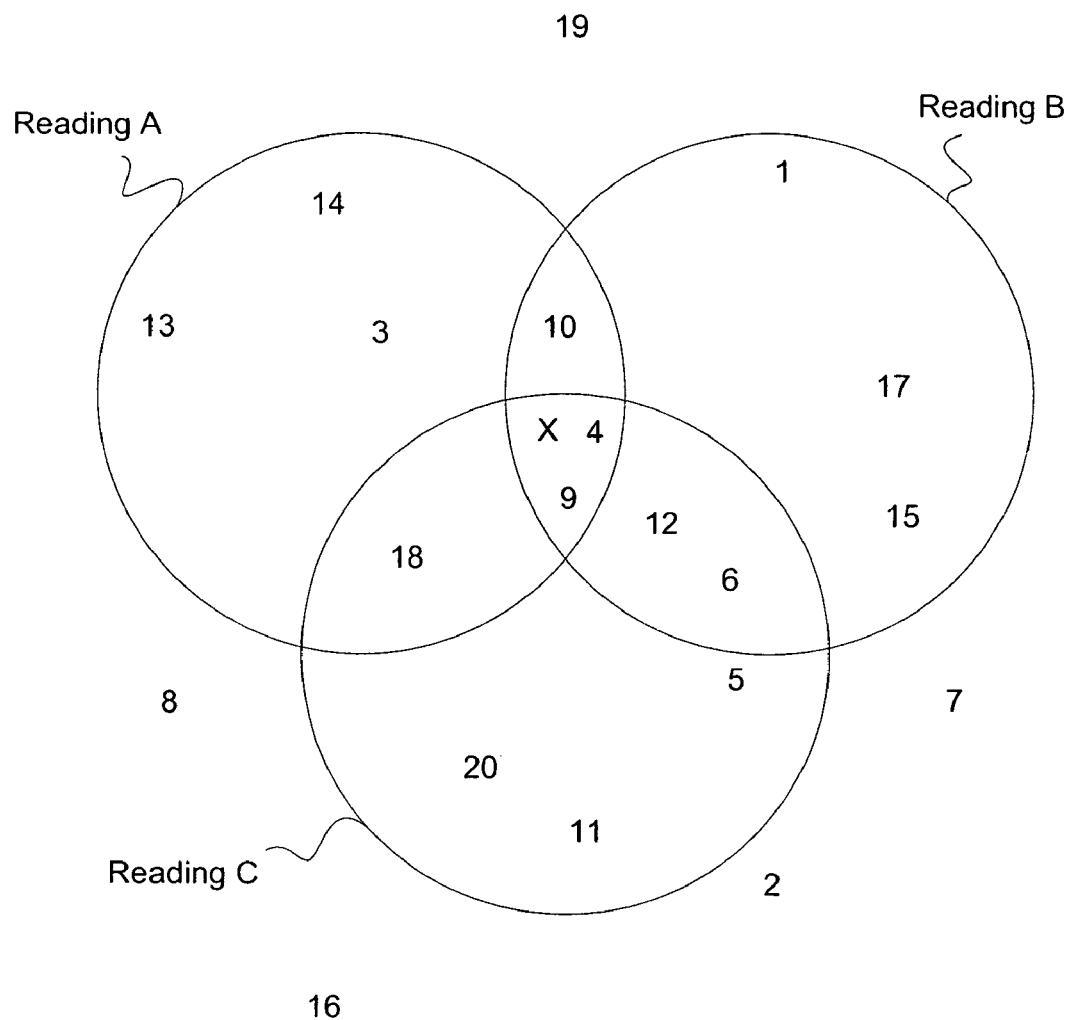
FIG. 2C illustrates an embodiment of the association of fiducial and item level RFID tags.

It will be appreciated that there are a variety of algorithms that may be used by a location system to calculate or estimate the likely location of tagged objects. FIG. 2C graphically illustrates, by way of a Venn diagram, how one embodiment of a location algorithm may function in a situation where the physical location of fiducial tags was not recorded (or otherwise provided to the location system) during deployment of the fiducial tags in the area. In the diagram of FIG. 2C, the various numbers represent different fiducial tags, each of which is attached to a fixed object located in a given area (e.g. a house). Whether the physical location of these objects is known or is not known to the system, logical identifiers may be assigned by a user to each of the objects associated with the fiducial tags. For example, fiducial tag 9 may be assigned the logical identifier of "kitchen sink." Users familiar with the area (i.e. house) will have no trouble locating the kitchen sink. As a result, in one embodiment, the system may provide feedback to a user in a form that human users would expect to get if they asked a real person.

In FIG. 2C, the Venn diagram illustrates a manner of visualizing how data from multiple readings (performed at different locations) allows a location system to localize a tagged item to a fraction of the reader's read range. Each of the three circles (marked as Reading A, Reading B and Reading C) represent readings by an RFID reader performed at different locations. The placement of the numbers with respect to the circles represent the locations of fiducial tags in relation to each other across the several readings. The fiducial tags are attached to objects which are not expected to move. The system associates each numbered tag with a logical name of the object to which it is attached. In the example of a home or residence, fiducial tag 9 of FIG. 2C may be assigned the logical identifier of "kitchen sink." If a reading for the tagged item "X" is obtained in each of the three locations, the overlap indicates the fiducial tags to which item "X" is likely nearby. For example, in FIG. 2C, fiducial tags "4" and "9" overlap for all three readers, and since item "X" is read by all three readers, then item "X" is likely near both fiducial tags 4 and 9.

Referring still to FIG. 2C, in an exemplary embodiment, the system associates fiducial tag 4 with "kitchen table," fiducial tag 9 with "kitchen sink," and item tag X with "Arno's glasses." Thus, in response to a user's query as to the location of Arno's glasses, the system may return the logical names of the areas associated with the sought for item, i.e. Arno's glasses are near the kitchen table and the kitchen sink. Even though exact locations may not be known for tagged items, the system is capable of inferring the location through correlation of the item tag with fiducial tags. Further, the reference to logical descriptions (e.g. kitchen sink) rather than exact physical coordinates, permits an easier system installation, as well as a more friendly user interface.

FIG. 2D illustrates an embodiment of the reading data of FIG. 2C presented in a table format. A simple table, as shown in FIG. 2D, can be generated to tabulate readings of an item tag X in conjunction with particular fiducial tags over each of the three readings A, B and C. The row labeled as Total in FIG. 2D represents the sum of all events in which a particular fiducial tag was read simultaneously with item tag X. For example, fiducial tag 17 was read simultaneously with item tag X for Reading B; accordingly, a 1 is entered under the Reading B row for fiducial tag 17, and the Total associated with fiducial tag 17 is 1. In the particular example illustrated, fiducial tags 4 and 9 are the only location tags read simultaneously with item tag X for all three of the Readings A, B, and C; accordingly the Total associated with fiducial tags 4 and 9 is 3. Since 3 is the highest value in the Total row, the system would return the logical names associated with fiducial tags 4 and 9 (i.e. "kitchen table" and "kitchen sink," respectively) in response to a query for the location of an item associated with item tag X.

In one embodiment, similar to the examples described with respect to FIGS. 2C and 2D, two or more classes (or groups) of RFID tags are deployed within a space. For example, a first class of tags may consist of fiducial tags fixed at specific locations, while a second class may consist of item tags attached to moveable items. Upon performing readings of both classes of tags across several different locations, a system may record which tags of the first class are read simultaneously with the second class of tags. The system may them use an algorithm to determine an association of a particular tag within the first class with one or more tags of the second class. This information may be used, for example, to determine a location or other characteristic of a tag of the second class.

In one embodiment, an RFID reader is capable of providing feedback to indicate an approximate location of a tagged item. For example, in one embodiment, a user may carry the mobile reader with them through a space, the user having indicated to the reader a particular item the user desires to locate. Upon reading a tag associated with the desired item, the reader may provide feedback to the user to indicate the location of the item. The location of the tagged item may be interpolated or estimated based on readings of fiducial tags proximate to the tagged item, as described herein. The feedback may be visual (e.g. displaying a graphical map showing the item's location with respect to reference points within the space, such as aisles and shelves), or audible (e.g. the reader may produce an audio message identifying the approximate location of the item, such as by returning the logical names of the fiducial tags closest to the moveable item being sought).

In one embodiment, the data collected by a reader, and the resulting estimation of the locations for tagged items with respect to fiducial tags, may be used to facilitate user interaction with an RFID system. For example, in one embodiment, an RFID reader may have voice recognition and speech synthesizing capabilities. A home owner goes about her house placing both fiducial and item tags on various objects without regard to their location. The tags are identified to the system merely by descriptive names rather than specific locations. In one embodiment, an algorithm is used to relay to the system the number of each fiducial and item tags as the homeowner applies them. Over time, using for example a mobile RFID reader, the system accumulates information on each item tag, as described above. The homeowner might carry a mobile RFID reader with her, or put it on her dog's collar, for example. By way of example, if a tagged item hasn't been moved since the last reading by a reader within its vicinity, the system can respond to the homeowner's verbal query of "Where did Paul leave his glasses," with an audible response of "near Paul's night table and the small bedroom mirror." Also, if the item proves to be somewhere else, the seeker can carry the reader to various parts of the house. In this case, the reader lets its user know when it is within read range of the item sought and, as the reader moves closer to the glasses, informs the user of their likely neighbors with ever-increasing precision, such as "the glasses are near the remote control."

In another embodiment, the system may assign a unique identifier to each group (constellation) of fiducial tags it reads at a single time, e.g. the group of fiducial tags F0-F9 may be group "A". Whenever the reader reads an item tag, the system associates the identifier of the then current constellation with the item associated with the item tag. As the reader moves throughout the space, each item will be associated with a list of constellations in which it's item tag has been read. Thus, whenever the system wants to locate an item precisely, it uses that particular item's list of associated constellations to locate the tag to identify the item's nearest fiducial tags. For instance, in one embodiment, the system could select the fiducial tag(s) most often in the list of constellations associated with that item. Such an embodiment may be useful in "real world" applications of RFID fiducial tags, such as those using two or three dimensional layouts of fiducial tags, non-uniform spacing between fiducial tags, as well those application having attenuating structures present.

In one embodiment, from a first location, a mobile RFID reader may read all tags within its range, and compile a list of all fiducial tags from that location. This list may contain a time stamp that indicates when the list was compiled. The list is assigned an identifier, which is associated with all of the tagged items read within range of the moving reader, until the reader encounters a new fiducial tag that is not among the list. Upon reading a new fiducial tag, the process is then repeated. As the process continues, additional location information is gathered for the tagged items encountered.

In one embodiment, the fiducial tags may be arranged in a grid pattern, for example, within a warehouse. In another embodiment, the strength of a response signal from a package tag may be used in estimating the location of the package with respect to the fiducial tags. In still yet another embodiment, fiducial tags may be placed in a three dimensional layout, to provide for localization of tagged items with three dimensional precision.

In one embodiment, the association of a group of item tags with a particular fiducial tag can be used to rapidly check for new additions of tagged items to the area around a fiducial tag. In an area that contains a large population of tags, it can be very time consuming for the reader to inventory all the tags in that area. In some cases, there could be tens, hundreds, or thousands of tagged items present. If the purpose of a reading event is to determine whether new tagged items are now in the vicinity of the fiducial tag, all of the tags present must be sorted through. However, by associating a fiducial tag with a group of tagged items, the reader could issue commands to quickly deactivate or put to sleep all known tags in that group. The reader could then quickly search for any new tagged items in the area, which would not be on the original list of tags within the group, and as such would remain active.

Figure 3:
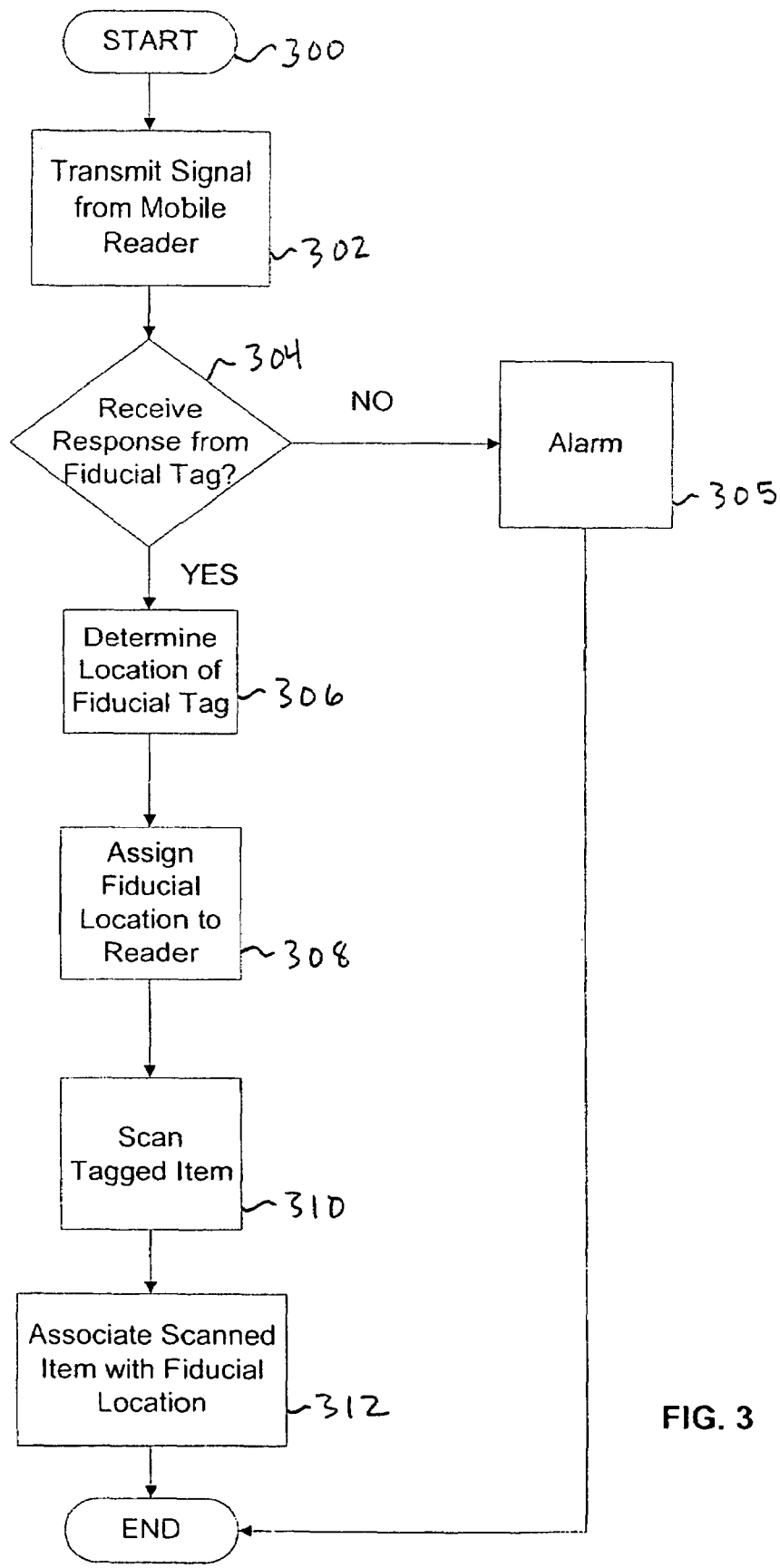
FIG. 3 illustrates an embodiment of a mobile RFID reader location method.

In another embodiment of the present invention, a portable or mobile reader is able to independently determine its location as it is moved from place to place by reading fiducial tags. FIG. 3 illustrates an embodiment of a mobile RFID reader location method 300, which may be employed within a mobile RFID reader system. In one embodiment, a mobile RFID reader is a handheld device. In another embodiment, a mobile reader is a standard reader that is readily mobile, such as a reader placed on a cart. At block 302, the mobile reader transmits a signal to elicit a response from RFID tags within range of the reader, such as fiducial RFID tags and RFID tags attached to tracked items. In one embodiment, as discussed above, the mobile reader may be programmed to transmit a signal to scan for fiducial tags within range once every second, or some other suitable time interval. At block 304, the reader determines whether a response is received from a fiducial tag. If a response is not received at block 304, an alarm or other notification may be provided at block 305 to indicate (e.g. to a network or reader administrator) that the reader is not operating within range of a fiducial tag. In one embodiment, the alarm may serve as an anti-theft deterrent for items attached to the reader, or the reader itself. As discussed above, in one embodiment, the alarm may be deferred until a threshold number of failed attempts to locate a fiducial has been met.

If a response from a fiducial tag is received at block 304, the system then determines the location associated with the fiducial tag at block 306. The location of the fiducial tag may be determined by the reader, another element of the system (e.g. a server computer), or a combination of both. For example, in one embodiment, the reader may decode the fiducial's location itself, or the reader may forward the fiducial tag's unique ID to a network, which provides the reader with the fiducial's location. At this point in the method 300, the reader's location has been determined. In one embodiment, the reader's location information is provided to the network. Once a reader's location has been determined, this information may be used to accomplish a variety of useful tasks. In one exemplary embodiment, a mobile reader only becomes trusted (e.g. its readings will be recorded) if it is within reading range of a particular fiducial tag. In another embodiment, a mobile reader only becomes operational if it is within reading range of a particular fiducial tag. In another embodiment, the reader compares the fiducial tag location with an expected location of the mobile reader, if the reader has been assigned a specific location to operate within. If the fiducial location is not the same or not within a range of permissible locations for the reader, an alarm 305 may be triggered.

In one embodiment, the mobile reader does not initially have an assigned expected location. At block 308, after determining the fiducial's location, the reader assigns the fiducial's location as the reader's own location. In one embodiment, at block 310, the reader is then used to scan RFID tagged items, such as inventory within a warehouse or goods at a point-of-sale. At block 312, since the reader is aware of its location, the reader may automatically associate scanned items with the reader's location. In one embodiment, the reader may then forward information to a network to provide information for both the item scanned as well as its location. This may be useful when a using a mobile reader to actively scan items over a variety of locations. Since the reader may determine its location via fixed fiducial tags, a user may continue to scan items without having to manually update the mobile reader's location, while providing a network with both item and respective location data. For example, in one embodiment, a mobile RFID reader is initially used at a first cash register or point-of-sale (POS1). The reader reads the fiducial tag fixed at POS1, and associates subsequently scanned items as having been scanned at POS1. If the reader is then moved over to another point-of-sale (e.g. POS3), the reader can no longer read the fiducial associated with POS1. However, the reader then reads the fiducial associated with POS3, and associates subsequently scanned items as having been scanned at POS3. The output of these reads can be graphically conveyed by the generation of a map showing the location of fiducial tags and item tags. For example, a map may be an abstract representation of the physical features of a particular space (e.g. warehouse, store, home, etc.) graphically displayed, for example, on a display device. This reader-generated map may be overlaid onto a map of the physical area or space for output to the user, to visually indicate the various locations of fiducial tags and item tags with respect to the physical layout of the particular space.

In one embodiment, a robotic mobile RFID reader may be used to take an automated inventory of tagged items within a space (e.g. a warehouse or grocery store) having a plurality of fiducial tags. For example, in one embodiment, a robotic mobile RFID reader may randomly roam throughout a warehouse, periodically reading the tags it encounters. As the mobile reader moves throughout the space, it may encounter both fiducial RFID tags as well as tags attached to inventory items. For example, fiducial tags may be positioned throughout the space, e.g. on each aisle or shelf. As described above, the data acquired from the mobile reader may be used to associate particular tagged items with approximate locations. For example, from a stationary position, the reader may read a fiducial tag associated with a particular shelf, as well as a tagged item; from this information it may be inferred that the tagged item is proximate to the fiducial tag. Thus, in addition to taking inventory (i.e. which items are accounted for), the location of these items may also be identified (i.e. where each of the items are physically located). One use of this embodiment may be to have a robotic reader wander through the aisles of a supermarket at night or during other low-traffic times, to take a location-based inventory of shelved tagged items. In another embodiment, the mobile RFID reader may deterministically (i.e. using a predefined course or path) traverse the desired space.

In one embodiment, an RFID reader may also include a sensor means for determining some aspect of the environment. For example, the reader may be able to detect temperature, humidity, smoke, acoustic noise, light, motion, security conditions, or the presence of some chemical or biological agent. Alternatively, each fiducial tag may comprise one or more sensors, which collect sensor data that can be read by the mobile reader. In these cases, the movement of the reader is used to generate a map showing the sensor output (sensor data) at each location served by a fiducial tag. In this way, an autonomous machine can be used to scan for a hazard in an area, and report back its association with a location-based fiducial tag. Alternatively, the autonomous machine, a computing device, or a human user could quickly develop a map of the temperature, noise level, or background chemical level of an area through the traversal of the reader and collection of sensor data. Again, a time stamp may be associated with the data or map to allow for comparison of the map with maps generated at different times.

An RFID tag may be used to enable or affect the performance of an RFID reader. In one embodiment, upon reading a fiducial tag, a reader's properties or mode of operation are modified in response to the tag. For example, when a reader reads a fiducial tag located at specific portal, the reader may adjust the interval between scans for tagged items. In an alternate embodiment, using a multi-frequency reader, the reader may alter the specific radio frequency at which it scans for tags, based on the location associated with a detected fiducial tag. In another embodiment, in response to reading a specific fiducial tag, a data stream is sent over the network to indicate the reader's proximity to the tag.

In yet another embodiment, a tag may act as a control for an RFID reader. For example, upon coming into proximity of a tag (either an item tag or a fiducial tag), a reader may respond by turning on, turning off, rendering the reader unusable for a period of time, permanently disabling the reader, or by activating a specific operating mode of the reader (e.g. changing the response of the reader to other RFID devices). In another embodiment, upon coming into proximity of a tag, a reader may change a security or encryption code associated with the reader. In yet another embodiment, upon coming into proximity of a tag, a reader, which has sensor means other than those for RFID, may change its response to other non-RFID inputs. For example, an RFID reader may also include a motion sensor that triggers an alarm if a person comes near the reader. An RFID tag may be used to deactivate this motion sensor and/or other sensor means.

It will be appreciated that embodiments of the present invention may be implemented for both mobile and stationary readers. In one embodiment, one application can be in an emergency situation. For example, firefighters or emergency personnel, could carry an RFID reader with them into buildings. Rooms within the building can be equipped with RFID fiducial tags (e.g. embedded in floors, doorways, etc.). When the emergency worker enters a room, the reader reads the fiducial tag, determines the location of a fiducial tag and hence the location of the emergency worker. The worker may then use this information as a navigational aid. In one embodiment, this information can be sent wirelessly to a control center. This may be useful for tracking an emergency worker's progress/path in an endangered building, thereby facilitating retrieval of the worker should it be necessary. In another embodiment, the control center has access to the building plans, and the control center can then send instructions back to the emergency worker on how to proceed. The emergency worker may have a portable or heads-up display that can provide a visible indication of the building plan, and their location within the building. Such a capability could be particularly valuable in low-visibility situations, such as at nighttime or in buildings filled with smoke, where it is often difficult for the emergency worker to see.

In another embodiment, a mobile reader can use proximity to an RFID tag (either an item tag or a fiducial tag) as a control system. For example, moving a reader into proximity of a tag may cause the reader to respond to a predetermined signal provided by the tag (e.g. the tag's RFID identification number). Such a response by the reader may induce or enable a response by a device controlled by the reader (e.g. an audible alarm). For example, a reader may be coupled to an alarm which is triggered if the reader is able to detect a particular fiducial tag.

For example, in one embodiment, a mobile reader could be coupled (e.g. via a collar) to a pet, such as a dog. Fiducial tags may be affixed to objects in the house, such as a sofa or other furniture. If the dog approaches the sofa, the reader may read the sofa's fiducial tag, which can trigger an alert, such as the playback of recorded audio of the owner's voice commanding the dog to stay off of the sofa. In another example, in an emergency situation a mobile reader could be configured to provide an alert if it gets close to a hazardous area marked by a fiducial tag. Such a reader could be carried by an emergency worker to warn the worker of danger, or provide feedback to an emergency worker as to whether they are on the proper path. In one embodiment, a fiducial tag serving as a hazard warning may become active only upon a specific change in the environment, such as an altered, elevated, or reduced temperature.

In another embodiment, the fiducial tag is associated with a means of determining whether the tag, or one or more objects associated with the tag, have been tampered with. The response of the fiducial tag to a reader may be modified to report whether a tamper event has occurred.

In another embodiment, the fiducial tags may be used in helping locate a tagged item, if this item has been read by the reader and previously associated with a list of a group of tags. For example, if analysis of the group list indicates that the tagged item is likely in the vicinity of a particular fiducial tag "A" and a particular fiducial tag "B", the reader may indicate that the item is near or between these items to a user. Various forms of output can be used. For example, the reader may generate a map (e.g. on a graphical display of the reader) showing the location of fiducial tags "A" and "B", and optionally show the user's (or the reader's) current location. Alternatively, the reader may have associated the fiducial tags "A" and "B" with nearby objects (such as fiducial tag "A" being equivalent to "the Table" and fiducial tag "B" being equivalent to "the Sofa". The reader could then provide audio or visual output to direct the user to those objects.

In one embodiment, an RFID tag may be coupled to an RFID reader. Such an RFID tag may be positioned on the RFID reader within the reading path of the reader's antenna. The RFID tag could serve to verify the proper functioning of the reader. For example, since the tag is known to be within range of the reader's antenna (in one embodiment, it may abut the antenna), a properly functioning reader should always be capable of reading the coupled RFID tag. If the reader is unable to read the reader-coupled RFID tag, an alarm may be triggered to provide notification that the reader may be malfunctioning.

It will be appreciated that in other embodiments of the present invention, other means for a reader to identify or confirm its location may be employed. In one embodiment, a fixed object may emit a coded visible or infrared (IR) signal to be detected by an appropriate detector on a properly located reader. If the reader were moved from its expected position, it would no longer detect the signal, and could then trigger an alarm. For example, in one embodiment, referring to FIG. 1, reader 110 may detect an IR signal when reader 110 is located in its expected location; however, if moved from its expected location, the reader 110 would not be able to detect the signal, and could trigger an alarm. One advantage of the use of visible or IR radiation is that radio frequency (RF) noise would not impair the reader's ability to determine its location. In another embodiment, the reader may include a built-in global positioning system (GPS) device to provide positional information to the reader. This GPS information could then be transmitted to the control network to determine whether the reader is in its expected location. Alternatively, such a determination could be made by the reader itself.

In yet another embodiment, such as in the case where a portable reader is employed, the reader may include a built-in accelerometer. When the portable reader is moved, the accelerometer detects this motion, and tracks the movement of the reader. By combining the records of motions detected by the accelerometer, the reader position can be determined. In one embodiment, by combining last known readings of fiducial tags with accelerometer data, the reader position may be determined when no fiducial tags are readable.

Figure 4:
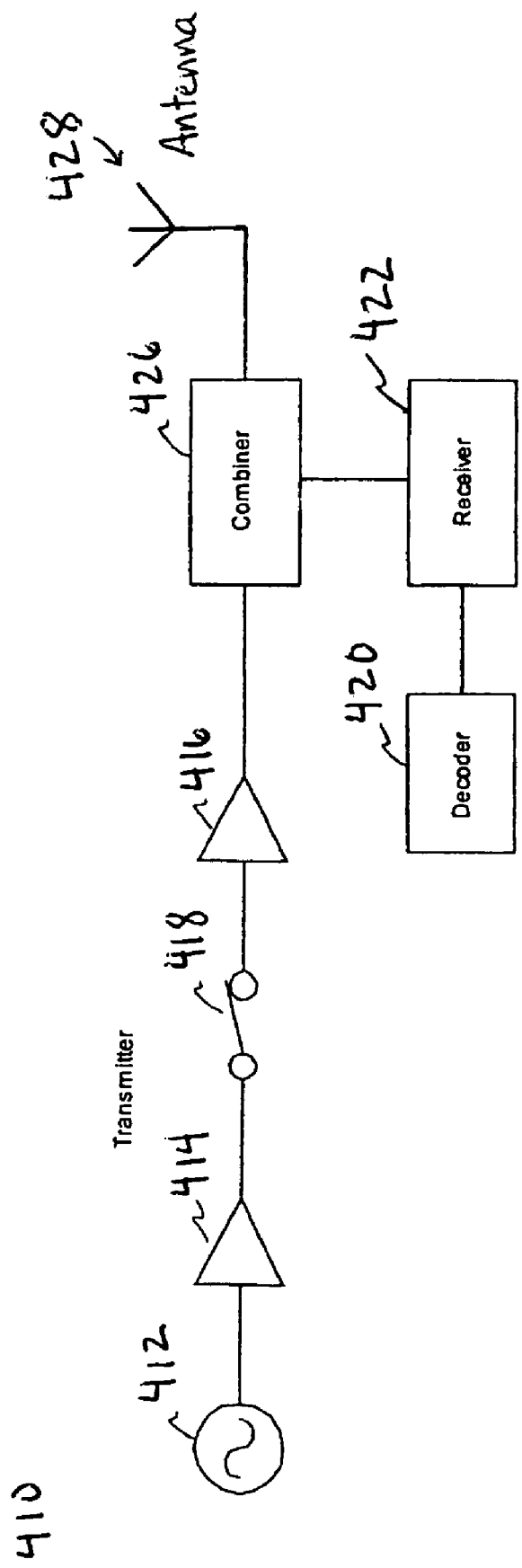
FIG. 4 illustrates an embodiment of an RFID reader.

FIG. 4 illustrates an embodiment of an RFID reader (also referred to as interrogator) 410 that may be used with embodiments of the invention described herein. The reader 410 communicates with an RFID tag via radio waves and passes the information in digital form to a computer system. For example, in one embodiment, reader 110 of FIG. 1 may have a similar configuration to reader 410. FIG. 4 shows a block diagram of the functional elements of a reader 410. The reader may include a wave generator 412, two amplifiers 414 and 416, a switch 418, a decoder 420, a receiver 422, a combiner 424, and an antenna 428. In one embodiment, the antenna 428 is a patch antenna. The receiver 422 receives the incoming data transmitted by the tag and forwards it to the decoder 420. The wave generator 412, two amplifiers 414 and 416, and the switch 418 comprise a transmitter, which generates outgoing waves to search for RFID tags. The combiner 424 switches between transmitting and receiving modes. The decoder 420 decodes the incoming signals received from the RFID tags to, for example, determine the identity (or locations) of the items to which they are attached. In one embodiment, the decoder 420 may also include logic functionality to perform functions such as comparing an expected location of the reader to a location of an RFID tag that has been read, identifying locations associated with tags read by the reader, to identify items attached to a read tag, to identify the expected location of the reader, or to trigger an alarm such as in the case where a fiducial tag is not able to be read, and triggering an alarm if the reader is not in an expected location.

In one embodiment, the reader 410 may be coupled to a network wirelessly or through a wired connection. Some of the functionality of the decoder 420 may be performed remotely by the network. For example, in such an embodiment, the decoder may decode a unique identification of the read tag, and transmit this information to the network for further processing. For example, in one embodiment, reader 410 communicates with the network to identify locations associated with tags read by the reader 410, to identify items attached to a read tag, to identify the expected location of the reader 410, or to trigger an alarm such as in the case where a fiducial tag is not able to be read. The reader 410 may also communicate with the network to transmit information about tagged items scanned by the reader 410.

Figure 5:
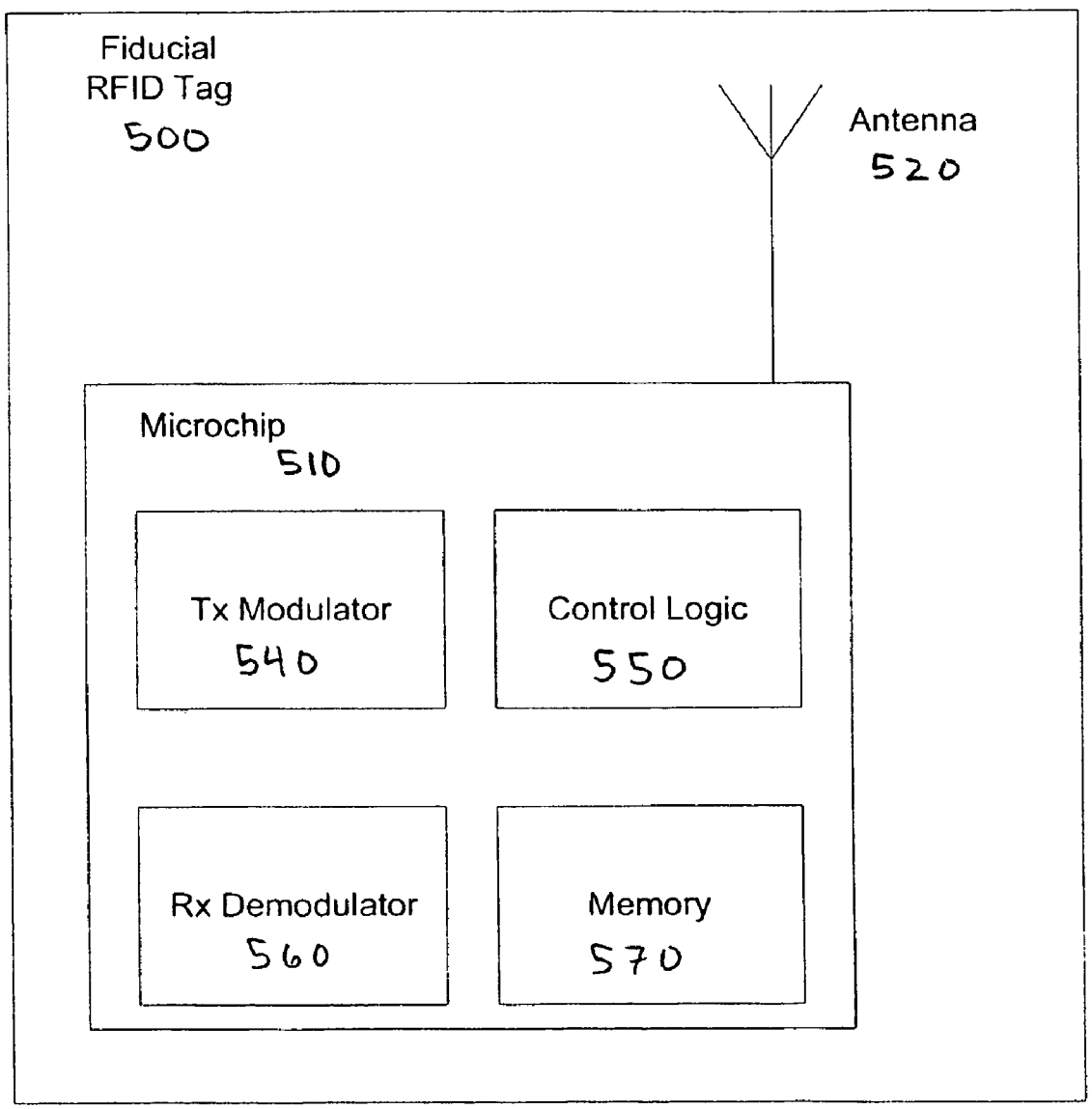
FIG. 5 illustrates an embodiment of a fiducial RFID tag.

FIG. 5 illustrates a block diagram of an embodiment of a fiducial RFID tag 500 (also referred to as a transponder) that may be used with embodiments of the invention described herein. It will be appreciated that a suitable RFID tag may include more or less components than described herein. Although a passive tag is described for purposes of clarity, it will be appreciated that embodiments of the present invention may employ other types of RFID tags such as active tags (battery-powered), semi-passive tags, read only tags, read/write tags, and chipless tags, among other types. Furthermore, tags operating at different frequency ranges, such as low frequency (LF) at about 125-134 KHz, High Frequency (HF) at about 13.56 MHz, Ultra-High Frequency (UHF) at about 868 to 928 MHz and Microwave at about 2.45 GHz, may be used in embodiments of the invention.

Fiducial tag 500 includes a microchip 510 attached to an antenna 520. The antenna 520 is a conductive element that enables the tag 500 to receive and send data. Antenna 520 is typically copper, aluminum, or silver, which has been wound, etched, or printed on a substrate. Passive tags at frequencies below 100 MHz usually have a coiled antenna that couples with the coiled antenna of the reader to form a magnetic field. Passive tags above 100 MHz usually employ dipole or folded dipole antennas that couple to the electric field of the reader emission. Passive tags above 100 MHz typically have longer range than passive tags below MHz. For both types of passive tags, the antenna 520 draws power from this field to power the microchip 510.

In one embodiment, microchip 510 includes a transmit modulator block 540, a receive modulator block 560, control logic block 550 and a memory 570. When the tag 500 is energized by the RF field, the received signal is demodulated at receive demodulator block 560. The control logic 550 determines the proper response to the received signal. Transmit modulator block 540 generates a modulated response signal which is transmitted to the reader through the antenna 520. In one embodiment, the response includes the contents of the microchip's 510 memory 570. The reader detects and demodulates the signal into digital information and identifies the tag, as described above. It should be recognized that there are numerous communication protocols that may be used for tag-reader communication, such protocols standardized by bodies such as International Organization for Standardization (ISO) and EPCglobal.

In one embodiment, fiducial tag 500 includes a unique serial number or identification code (UID), stored in memory 570 on the microchip 510. The signal returned by the tag 500 may include this UID. In one embodiment, the UID of fiducial tag 500 is associated with a specific location. The microchip 510 may also store other information which is returned to the reader, such as the specific location of a fiducial tag (e.g. latitude/longitude coordinates, elevation, etc.). The information sent to the reader is decoded by the reader, as described above.

In one embodiment, fiducial tag 500 may be coupled to a memory source to store other information besides the UID or location of the fiducial. For example, fiducial tag 500 may include a memory within microchip 510 on the tag 500. Alternatively, fiducial tag 500 may be coupled to an external memory source. In one embodiment, when a reader reads a fiducial tag having a memory source, the reader writes information to the fiducial tag, such as the time at which the reader last read the fiducial tag. This information may be subsequently transmitted to a control system to log and track reader use. In one embodiment, a fiducial tag 500 may serve as a pointer to a network for the reader to communicate with. For example, when a fiducial tag is read by a reader coupled to a network, such as the Internet, the tag may provide the reader with an internet protocol (IP) address of a server to which the reader should transmit its information to.

Figure 6:
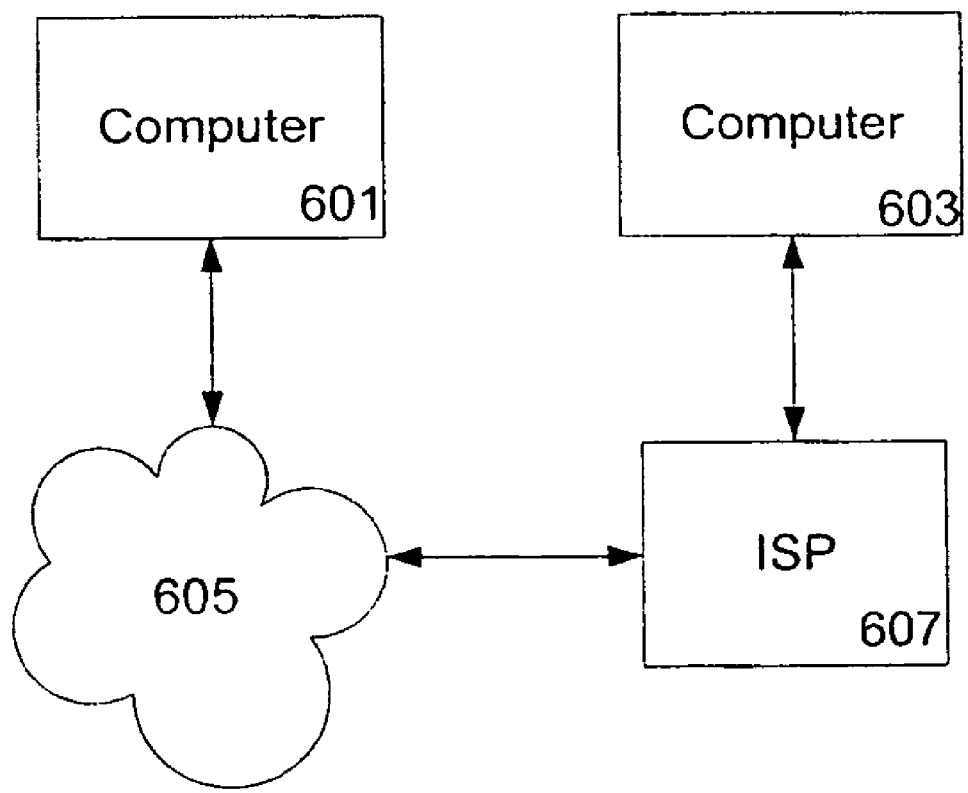
FIG. 6 illustrates an embodiment of an operating environment suitable for practicing the present invention.

As discussed above, various aspects of embodiments of the present invention may be implemented using a network. In one embodiment, as shown in FIG. 6, a computer 601 is part of, or coupled to a network 605, such as the Internet, to exchange data with another computer 603, as either a client or a server computer. For example, in one embodiment, the RFID reader 110 of FIG. 1 includes a computer 601 and is part of, or coupled to a network 605 (e.g. network 111 of FIG. 1) to exchange data with other computers 603 (e.g. control system 112 of FIG. 1). Typically, a computer is coupled to the Internet through an ISP (Internet Service Provider) 607 and uses a conventional Internet browsing application to exchange data with a server. Other types of applications allow clients to exchange data through the network 605 without using a server. It will be readily apparent that the present invention is not limited to use with the Internet; directly coupled and private networks are also contemplated.

Figure 7:
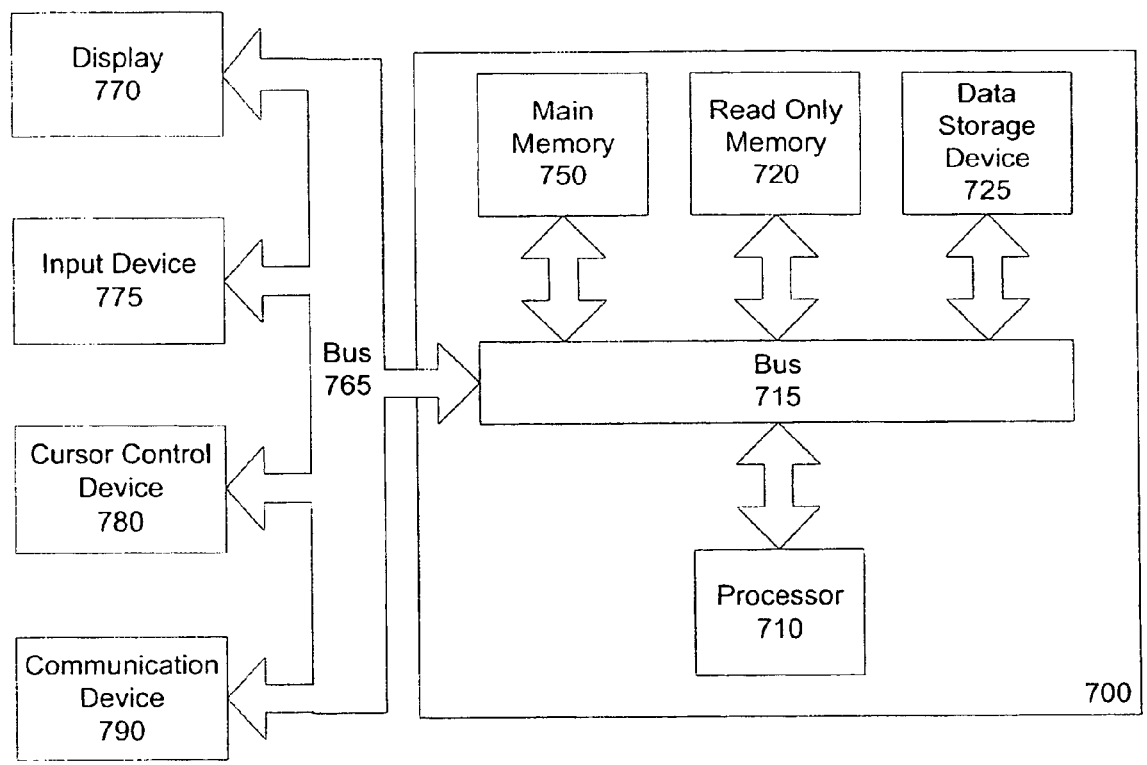
FIG. 7 illustrates an embodiment of a computer system suitable for use in the operating environment of FIG. 6.

FIG. 7 illustrates an embodiment of a computer system that may be used with the embodiments of the present invention. For example, in one embodiment, reader 110 of FIG. 1 includes a computing device or computer system similar to that described below with reference to FIG. 7. It will be apparent to those of ordinary skill in the art, however, that other alternative systems of various system architectures may also be used. The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, a wireless connection mechanism, or any other mechanism that provides connectivity between the computer system 700 and the outside world. For example, the communication device 790 may include coaxial cable, fiber-optic cable or twisted pair cable. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, data storage device 725, or any machine-accessible medium locally or remotely accessible to processor 710. A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.).

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the data storage device 725 and for causing the processor 710 to operate in accordance with the methods and teachings herein.

The present invention may also be embodied in a handheld, portable, or mobile device containing a subset of the computer hardware components described above. For example, the handheld device may be configured to contain only the bus 715, the processor 710, and memory 750 and/or 720. The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In other devices, communication with a user may be through the use of audio signals or language, either generated by the machine or spoken by the user.

The description of FIGS. 6 and 7 is intended to provide an overview of computer hardware and various operating environments suitable for implementing embodiments of the invention, but is not intended to limit the applicable environments. It will be appreciated that the system 700 is one example of many possible devices that have different architectures. A typical device will usually include at least a processor, memory, and a bus coupling the memory to the processor. Such a configuration encompasses personal computer systems, network computers, handheld devices, such as portable media devices, personal digital assistants, and similar devices. One of skill in the art will immediately appreciate that embodiments of the invention can be practiced with other system configurations, including multiprocessor systems, minicomputers, mainframe computers, and the like. Embodiments of the invention can also be practiced in distributed computing environments where tasks are performed by remote processing devices that are linked through a communications network.

The particular methods of embodiments of the invention are described in terms of computer software with reference to a series of flow charts. FIG. 2 illustrates a flow chart of one embodiment of a reader location method 200. FIG. 3 illustrates an embodiment of a mobile reader identification method 300. The methods 200 and 300 constitute computer programs made up of computer-executable instructions illustrated as blocks (acts) in FIGS. 2 and 3. Describing the methods by reference to a flow chart enables one skilled in the art to develop such programs including such instructions to carry out the methods on suitably configured computers. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement embodiments of the invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be appreciated that embodiments including more or fewer processes may be incorporated into the methods illustrated in FIGS. 2 and 3 without departing from the scope of the invention and that no particular order is implied by the arrangement of blocks shown and described herein.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

We claim:

1. A method comprising:
    determining an expected location of a fixed radio frequency identification (RFID) reader;
    transmitting first signal from the reader to a first RFID tag for the reader to determine whether the reader is at the expected location, wherein the first tag is a fiducial RFID tag, including an antenna, fixed at a first location;
    receiving at the reader a first response to the first signal from the first tag, wherein the first response identifies the first location; and
    comparing the first location with the expected location and if the first location and the expected location are different, assigning the first location as the expected location of the reader.

2. A method comprising:
    determining an expected location of a fixed radio frequency identification (RFID) reader;
    transmitting first signal from the reader to a first RFID tag for the reader to determine whether the reader is at the expected location, wherein the first tag is a fiducial RFID tag, including an antenna, fixed at a first location; and
    wherein the determining the expected location of the reader comprises:
        transmitting a second signal from the reader to the first tag;
        receiving a response from the first tag, the response indicating that the first tag is associated with the first location; and
        assigning the first location as the expected location of the reader.

3. A machine-readable medium having instructions to cause a machine to perform a machine-implemented method comprising:
    determining an expected location of a fixed radio frequency identification (RFID) reader;
    transmitting a first signal from the reader to a first RFID tag for the reader to determine whether the reader is at the expected location, wherein the first tag is a fiducial RFID tag, including an antenna, fixed at a first location;
    receiving at the reader a first response to the first signal from the first tag, wherein the first response identifies the first location; and
    comparing the first location with the expected location, and if the first location and the expected location are different, assigning the first location as the expected location of the reader.

4. A machine-readable medium having instructions to cause a machine to perform a machine-implemented method comprising:
    determining an expected location of a fixed radio frequency identification (RFID) reader;
    transmitting a first signal from the reader to a first RFID tag for the reader to determine whether the reader is at the expected location, wherein the first tag is a fiducial RFID tag, including an antenna, fixed at a first location; and
    wherein the determining the expected location of the reader comprises:
        transmitting a second signal from the reader to the first tag;
        receiving a response from the first tag, the response indicating that the first tag is associated with the first location; and
        assigning the first location as the expected location of the reader.

5. An apparatus comprising:
    means for determining an expected location of a fixed radio frequency identification (RFID) reader;
    means for transmitting a first signal from the reader to a first RFID tag for the reader to determine whether the reader is at the expected location, wherein the first tag is a fiducial RFID tag, including an antenna, fixed at a first location;
    means for receiving at the reader a first response to the first signal from the first tag, wherein the first response identifies the first location; and
    means for comparing the first location with the expected location, and if the first location and the expected location are different, means for assigning the first location as the expected location of the reader.

6. An apparatus comprising:
    means for determining an expected location of a fixed radio frequency identification (RFID) reader; and
    means for transmitting a first signal from the reader to a first RFID tag for the reader to determine whether the reader is at the expected location, wherein the first tag is a fiducial RFID tag, including an antenna, fixed at a first location; and
    wherein the means for determining the expected location of the reader comprises:
        means for transmitting a second signal from the reader to the first tag;
        means for receiving a response from the first tag, the response indicating that the first tag is associated with the first location; and
        means for assigning the first location as the expected location of the reader.

7. A system comprising:
    a processing unit coupled to a memory through a bus; and
    a process executed from the memory by the processing unit to cause the processing unit to:
        determine an expected location of a fixed radio frequency identification (RFID) reader;
        transmit a first signal from the reader to a first RFID tag for the reader to determine whether the reader is at the expected location, wherein the first tag is a fiducial RFID tag, including an antenna, fixed at a first location;
    the process further causes the processing unit to receive at the reader a first response to the first signal from the first tag, wherein the first response identifies the first location; and
    the process further causes the processing unit to compare the first location with the expected location and if the first location and the expected location are different, assign the first location as the expected location of the reader.

8. A system comprising:
    a processing unit coupled to a memory through a bus; and
    a process executed from the memory by the processing unit to cause the processing unit to:
        determine an expected location of a fixed radio frequency identification (RFID) reader;
        transmit a first signal from the reader to a first RFID tag for the reader to determine whether the reader is at the expected location, wherein the first tag is a fiducial RFID tag, including an antenna, fixed at a first location;

transmit a second signal from the reader to the first tag;
receive a response from the first tag, the response indicating that the first tag is associated with the first location; and
assign the first location as the expected location of the reader.

9. A radio frequency identification (RFID) reader for use in reading RFID tags, the reader comprising:
a transmitter to transmit a first signal from the reader to an RFID tag including an antenna;
a receiver to receive a second signal from the RFID tag, the second signal identifying a first location of the RFID tag, wherein the first location is capable of being compared to an expected location of the reader to determine whether the reader is at the expected location; wherein the reader is communicatively coupled to a computing device on a network, the computing device to compare the first location with the expected location, and the computing device is further to assign the first location as the expected location of the reader if the first location and the expected location are determined to be different.

10. A method comprising:
transmitting a signal from a radio frequency identification (RFID) reader, the signal to elicit responses from RFID tags;
receiving at the reader a response to the signal from at least one fiducial RFID tag including an antenna, the fiducial RFID tag being fixed at a known location within a space;
receiving at the reader a response to the signal from a first RFID tag, wherein the first RFID tag is attached to a moveable object;
estimating a location of the object within the space based on the responses received from the at least one fiducial RFID tag and the first RFID tag; and
estimating a range within which the reader is able to read RFID tags based on the response received from the at least one fiducial RFID tag.

11. A method comprising:
transmitting a signal from a radio frequency identification (RFID) reader, the signal to elicit responses from RFID tags;
receiving at the reader a response to the signal from at least one fiducial RFID tag including an antenna, the fiducial RFID tag being fixed at a known location within a space;
receiving at the reader a response to the signal from a first RFID tag, wherein the first RFID tag is attached to a moveable object;
estimating a location of the object within the space based on the responses received from the at least one fiducial RFID tag and the first RFID tag;
receiving at the reader a plurality of responses from a plurality of fiducial RFID tags, the plurality of fiducial RFID tags being fixed at known locations within the space; and
wherein estimating the location of the object is based on the responses received from the plurality of fiducial RFID tags and further comprises: estimating the location of the object comprises:
creating a first matrix based on the responses received from the plurality of fiducial RFID tags over a set of times, each time of the set of times corresponding to a reading taken by the RFID reader at a specific location;
creating a second matrix based on responses received from the first RFID tag over the set of times;
multiplying the first matrix by the second matrix to obtain a third matrix; and
estimating the location of the object based on the values within the third matrix.

* * * * *